United States Patent [19]
Adler et al.

[11] Patent Number: 5,581,465
[45] Date of Patent: Dec. 3, 1996

[54] PROCESS FOR CHANGING THE SPEED OF A VEHICLE AND A SYSTEM FOR IMPLEMENTING THE PROCESS

[75] Inventors: Uwe Adler, Schweinfurt; Hans-Jürgen Drexl, Schonungen; Dieter Lutz, Schweinfurt; Franz Nagler, Ottendorf; Martin Ochs; Stefan Schiebold, both of Schweinfurt; Hans-Joachim Schmidt-Brücken, Geldersheim; Wolfgang Thieler, Hassfurt; Michael Wagner, Niederwerrn; Holger Westendorf, Hambach; Rainer Wychnanek, Madenhausen, all of Germany

[73] Assignee: Mannesmann Aktiengesellschaft, Düsseldorf, Germany

[21] Appl. No.: 199,128
[22] PCT Filed: Aug. 25, 1992
[86] PCT No.: PCT/DE92/00711
   § 371 Date: Apr. 15, 1994
   § 102(e) Date: Apr. 15, 1994
[87] PCT Pub. No.: WO93/03940
   PCT Pub. Date: Mar. 4, 1993

[30] Foreign Application Priority Data

Aug. 26, 1991 [DE] Germany .......................... 41 28 627.8

[51] Int. Cl.⁶ .......................... G06F 19/00; G06F 7/70
[52] U.S. Cl. .......................... 364/431.07; 364/462.041; 364/426.01
[58] Field of Search .......................... 364/431.01–431.12, 364/426.02, 426.04, 424.1, 424.01, 426.01; 180/197, 170, 248, 76, 249; 303/100, 103; 192/3.23, 4 A, 3.3, 56 F; 123/352; 318/258, 257, 269

[56] References Cited

U.S. PATENT DOCUMENTS

| | | | |
|---|---|---|---|
| 3,675,512 | 7/1972 | Hirozawa | 192/56 F |
| 3,755,724 | 8/1973 | Anderson | 318/139 |

(List continued on next page.)

FOREIGN PATENT DOCUMENTS

| | | | |
|---|---|---|---|
| 0424868 | 5/1981 | European Pat. Off. | |
| 2701567 | 7/1978 | Germany . | |
| 0142633 | 5/1985 | Germany . | |
| 3721605 | 1/1988 | Germany . | |
| 3727690A1 | 3/1989 | Germany | F02D 28/16 |
| 3827884A1 | 2/1990 | Germany | B60K 9/08 |
| 3840623A1 | 6/1990 | Germany | B60K 28/16 |

*Primary Examiner*—Kevin J. Teska
*Assistant Examiner*—Jacques Louis-Jacques
*Attorney, Agent, or Firm*—Cohen, Pontani, Lieberman, Pavane

[57] ABSTRACT

A process for changing the speed of a vehicle with driving wheels and with a continuously adjustable speed/torque characteristic in the drive train, in particular a vehicle with electric motor drive, corresponding to a change in the position $\alpha(t)$ of an accelerator pedal carried out by the driver of the vehicle, in which every position $\alpha(t)$ of the accelerator pedal is associated with a determined drive output $P_v(\alpha) = f_1(\alpha) \times P_{max}$ (where $P_{max}$=maximum drive output of the vehicle) and/or driving torque $M_v(\alpha) = f_1(\alpha) \times M_{max}$ (where $M_{max}$=maximum driving torque of the vehicle) which is desired in the sense of a predetermined value and acts on the vehicle. To provide a process and a device for implementing the process permitting the driver to change the actual speed of the vehicle to a different desired value in the most uncomplicated and reliable manner, the predetermined value $P_v(t)$ and/or $M_v(t)$ is converted for an electronic drive control of the vehicle, the reference value $P_s(t)$ or $M_s(t)$ is changed to the predetermined value $P_v(t)$ or $M_v(t)$ within an adjustment time period, wherein the reference value $P_s(t)$ or $M_s(t)$ is formed by addition from an initial proportion proportional to the predetermined value $P_v(t)$ or $M_v(t)$ and a residual proportion changing over time.

23 Claims, 5 Drawing Sheets

U.S. PATENT DOCUMENTS

| | | | |
|---|---|---|---|
| 3,845,368 | 10/1974 | Elco | 318/139 |
| 4,217,529 | 8/1980 | Bourke et al. | 388/806 |
| 4,551,659 | 11/1985 | Markham | 318/258 |
| 4,622,636 | 11/1986 | Tachibana | 364/426.04 |
| 4,677,560 | 6/1987 | Cao et al. | 364/426.04 |
| 4,833,612 | 5/1989 | Okuno et al. | 364/426.04 |
| 5,021,958 | 6/1991 | Tokoro | 364/426.04 |
| 5,155,682 | 10/1992 | Ninoyu | 364/426.04 |
| 5,163,530 | 11/1992 | Nakamura et al. | 364/426.01 |
| 5,260,876 | 11/1993 | Oo et al. | 364/426.04 |
| 5,329,455 | 7/1994 | Oo et al. | 364/426.04 |
| 5,361,207 | 11/1994 | Hayafune | 364/426.04 |

PROCESS FOR CHANGING THE SPEED OF A VEHICLE AND A SYSTEM FOR IMPLEMENTING THE PROCESS

BACKGROUND OF THE INVENTION

The invention is directed to a process for changing the speed of a vehicle with driving wheels and with a continuously adjustable speed/torque characteristic in the drive train, corresponding to a change in the position of an accelerator pedal carried out by the driver of the vehicle. Every position of the accelerator pedal is associated with a predetermined drive output $P_b(\alpha)=f_1(\alpha) \times P_{max}$ and/or a predetermined driving torque $M_v(\alpha)=f_1(\alpha) \times M_{max}$ as a predetermined value, wherein the predetermined value is used as a reference value for an electronic drive control of the vehicle. The invention is also directed to a vehicle for implementing this process.

Although electric motor drives have been common in rail-borne vehicles for decades, such drives have so far been used in road vehicles only in a few special cases. Particularly in the field of passenger automobile construction, this has generally involved experimental vehicles. In general, road vehicles continue to be outfitted with an internal combustion engine which acts on the driving wheels via a mechanical drive train. In order to utilize a range of the speed/torque characteristic of the internal combustion engine favorable for the driving conditions in question at different driving speeds, a manual or automatic transmission with a hydraulic torque converter is normally provided in the drive train. In this way, the operator or driver who initiates an acceleration process at a given speed of the vehicle by means of an appropriate change in the position of the gas pedal (accelerator) is afforded the possibility, by selecting the gear, to use different ranges of the speed/torque characteristic and accordingly different output stages for the acceleration process.

In electric motor drives, particularly in drives with DC motors having a permanently excited stator and rotor and a corresponding rotor or stator provided with electromagnets controlled via the output electronics, it is possible to adjust practically any optional speed/torque combinations within wide limits, which can be referred to in this sense as an infinitely variable or continuously adjustable speed/torque characteristic or speed/output characteristic. There are also vehicles with mechanical drive trains (CVT transmission) which offer similar freedom with respect to speed ratio or gear ratio variations.

In view of these special properties there is no need in such vehicles, even those having high top speeds (e.g., 200 km/h), for a manually or automatically actuated transmission in the drive train. But, in so doing, the operator of the vehicle is deprived of the possibility of substantially influencing the time required for carrying out a desired change in speed, i.e. the magnitude of the acceleration quantity, through a selection of a "driving gear" by actuating the gearshift lever or gear selector. The only possibility remaining for the driver to transmit a "driving selection" to the vehicle is that of actuating the accelerator pedal. This means that he has no particular way of conveying to the vehicle his desire for a determined target speed and his desire for the magnitude of acceleration to achieve this target speed, which desires must be viewed as mutually distinct.

Consequently, in known vehicles with electric motor drive the actual position of the accelerator pedal is interpreted as a determining quantity for the driving torque desired by the driver or for the desired drive output and is controlled directly corresponding to the characteristic of the drive. The selection of a determined driving torque M at a given speed n is synonymous with the selection of a determined drive output P in view of the following equation:

$$P = M \times n.$$

As a result of an increase in the driving torque (or drive output) in effect in stationary driving operation (i.e. at constant speed), the vehicle is accelerated until the increased driving torque is again in equilibrium ("stationary operation") with the opposite moment produced by the actual driving resistance forces (particularly the air resistance and rolling resistance).

In the case of a conventionally driven vehicle outfitted with an internal combustion engine, the new driving torque desired by the driver is never achieved in a sudden manner, but rather is only reached gradually corresponding to the characteristic of the internal combustion engine as the speed increases, barring the case of a gear change in which a sudden change in the speed/torque combination is effected in a compulsory manner.

In a drive design with continuously adjustable speed/torque characteristic, particularly as it relates to electric motors as known, for example, from EP 0 094 978 A1, DE 34 14 314 A1, DE 38 16 651 A1 or WO 89/08346, the drive control of the vehicle must set the value to which the drive parameters represented by speed and torque or output are to be adjusted during the acceleration process, i.e. until the desired new driving state has been achieved. The transition from the (stationary) driving situation at the start of the acceleration process to the desired driving situation could always be effected, for example, with the maximum possible torque or maximum output. This would entail a constant "sporty" driving mode which many drivers would find uncomfortable. However, lower values could also be set for implementing such acceleration processes, although this would have the disadvantage that the vehicle would behave too sluggishly in situations where particularly high acceleration values are desirable (e.g. passing). In principle, this disadvantage could be overcome in that the driver informs the drive control of the vehicle of his desire for sporty driving or for a more comfortable driving style via a selector switch. However, the fact that the actuation of such a selector switch could be required under dangerous circumstances must be viewed as a severe disadvantage. Moreover, a drive design with continuously adjustable speed/torque characteristic could also meet with some resistance on the part of the driver if this would mean that the vehicle would behave in a fundamentally different manner than that to which he is accustomed from conventionally driven vehicles. This is also true for the case of "negative" acceleration, i.e. for applying a braking torque when the driver backs off the position of the accelerator pedal.

Further, a vehicle with a drive slippage regulating system (ASR) which has a stepped transmission in the drive train and in which an electronic control unit provides a special conversion of the respective position of the accelerator pedal actuated by the driver of the vehicle into an engine torque to improve driving stability is known from DE 37 27 690 A1. Outside of the regulating operation of the ASR, the engine torque, per se, is determined in a conventional manner in direct correspondence to a given characteristic by the respective position of the accelerator pedal. However, this correspondence is limited to the lower adjustment range of the accelerator pedal. For easier management of critical driving situations, e.g. due to a sudden change in the friction coefficient of the roadway, it is suggested that a second characteristic which assigns a value for the reference slippage of the driving wheels to the accelerator pedal position in question is provided for the upper adjustment range of the accelerator pedal. In so doing, the engine torque is given only indirectly, that is, as a function of the driving situation in question (friction coefficient, extent of lateral forces, etc.). There is no reference made in this patent to the set of problems involved in carrying out changes in the speed of vehicles with continuously adjustable speed/torque characteristic in the drive train by actuating an accelerator pedal.

SUMMARY OF INVENTION

Therefore, the present invention has the object of providing a process and a device for implementation of this process permitting the driver to change the actual speed of the vehicle to a desired different speed in the most uncomplicated and reliable way possible.

Pursuant to this object, and others which will become apparent hereafter, one aspect of the present invention resides in a process of the above-discussed type in which an additional electronic control unit converts the predetermined value into an actual reference value for the electronic drive control. The drive control changes the reference value to the predetermined value within a short adjustment time period and the reference value is formed by adding an initial component proportional to the predetermined value and a residual component which changes over time.

In another embodiment of the invention, the component proportional to the predetermined value is formed as a sum of the actual reference value of the electronic drive control and a product of a weighting factor F between 0 and 1 and the difference between the predetermined value $P_v(t)$ or $M_v(t)$ and the actual reference value $P_s(t)$ or $M_s(t)$.

In a further embodiment, the value of the weighting factor F is determined as a function of the actuation speed $\dot{\alpha}$ of the accelerator pedal: $F=f_2(\dot{\alpha})$. The value of the weighting factor F can also be determined as a function of the actual reference value of the drive control: $F=f_3(P_s(t))$ or $F=f_3(M_s(t))$. It is further possible to determine the value of the weighting factor F as a function of the predetermined value: $F=f_4(P_v(t))$ or $F=f_4(M_v(t))$.

In an additional embodiment of the invention, the selected function curve of the weighting factor $F=f_2(\dot{\alpha})$ increases progressively and the value of F remains at a constant maximum value of 1 above a predetermined threshold of the variable $\dot{\alpha}$. It is also possible for the selected function curve of the weighting factor F to increase linearly and the value of F to remain at a constant maximum value of 1 above a predetermined threshold of the actual reference value.

In another embodiment the selected function curve of the weighting factor F increases linearly and the value of F remains at a constant maximum value of 1 above a predetermined threshold of the variable $P_v(t)$ or $M_v(t)$.

The acceleration of the vehicle is detected in still another embodiment via an acceleration sensor or by means of the derivative of the speed of the driving wheels over time, and the residual proportion for adjusting the reference value $P_s(t)$ or $M_s(t)$ to the predetermined value $P_v(t)$ or $M_v(t)$ is changed over time so that the acceleration of the vehicle remains constant between the time when the changed accelerator pedal position $\alpha(t)$ is reached and the time the predetermined value $P_v(t)$ or $M_v(t)$ is reached.

It is furthermore possible to change the residual proportion for adjusting the reference value $P_s(t)$ or $M_s(t)$ to the predetermined value $P_v(t)$ or $M_v(t)$ linearly or progressively within a time interval T (adjusting time period). The time interval T of the electronic control is selected so that it tends to decrease as the accelerator pedal adjusting speed $\dot{\alpha}$ increases.

In a vehicle whose electric drive motors are supplied with electric current by an internal combustion engine/generator unit and whose internal combustion engine is operated in a state with a definite relationship between torque and speed of the internal combustion engine, the residual component for adjusting the reference value $P_s(t)$ or $M_s(t)$ to the predetermined value $P_v(t)$ or $M_v(t)$ is changed as a function of the speed of the internal combustion engine. The factor $f_1(\alpha)$ for determining the predetermined value $P_v(\alpha)$ or $M_v(\alpha)$ is associated with the value of 0 in a neutral position $\alpha_n$ of the accelerator pedal and, at accelerator pedal positions between 0 and $\alpha_n$, is associated with negative values (braking output) for producing a braking torque by switching the electric drive motors to generator operation. The value of the braking output or braking torque at a given position of the accelerator pedal between 0 and $\alpha_n$, is adjusted as a function of the actual speed of the vehicle, and there is preferably a tendency toward lower braking torque at higher speeds.

In another embodiment of the invention, quotient $$\dot{\alpha} = \frac{\alpha(t_2) - \alpha(t_1)}{t_2 - t_1}$$

is used in place of the differential quotient in the weighting function $F=f_2(\dot{\alpha})$ for the variable $\dot{\alpha}$, where $t_2-t_1$ does not fall below a predetermined minimum value.

A further embodiment carries out changes in speed at vehicle speeds v below a predetermined value $v_1$ only by controlling the driving torque and at speeds above the predetermined value $v_2$ only by controlling the drive output. The transition from torque control to output control can be effected in a sudden manner at a vehicle speed $v_1=v_2$ or, the transition can be effected in a smooth or sliding manner in the speed interval from $v_1$ to $v_2$.

A further aspect of the invention resides in a vehicle for implementing the inventive process. The vehicle includes driving wheels and a drive train, having a continuously adjustable speed/torque characteristic in particular with an electric motor drive. An electronic drive control is provided for speed/torque adjustment in the drive train and an accelerator pedal is provided for changing the speed of the vehicle and whose position $\alpha(t)$ can be detected by means of a sensor. Predetermined values for the desired effective drive output of the vehicle and/or the desired driving torque are stored in the in the drive control in the form of a table or function and are associated in one-to-one correspondence with the possible accelerator pedal positions $\alpha(t)$. An additional electronic control unit is provided which is connected via a signal-transmitter with the sensor for detecting the accelerator pedal position $\alpha(t)$ on the one hand and is connected as a reference value transmitter with the drive control on the other hand. The additional electronic control unit converts the measurement values $\alpha(t)$ obtained by the sensor into the reference value for the drive control so that the reference value is changed within an adjustment time period until reaching the respective predetermined value. The reference value is formed by addition from an initial component proportional to the predetermined value and a residual component that changes over time.

In another embodiment of the inventive vehicle the additional electronic control unit is connected via another signal-transmitter with a second sensor for detecting the vehicle acceleration or, is outfitted with a differentiating device for calculating the vehicle acceleration from the change in the driving wheel speeds over time.

Still a further embodiment provides that the electric motor or electric motors of the vehicle drive is/are constructed as permanently excited DC motor(s) with electronic commutation.

DETAILED DESCRIPTION OF THE PREFERRED EMBODIMENTS

The following description of the invention is substantially restricted, by way of example, to a "standard situation" in which the accelerator pedal is changed from a position $\alpha_a$ occurring in stationary driving operation to an altered position $\alpha_e$ corresponding to a stationary driving operation desired by the driver. In so doing, it is assumed that the vehicle is to be accelerated to a higher speed. Of course, the process according to the invention can also be applied in a corresponding sense proceeding from a non-stationary driving operation and/or when the accelerator pedal position is to be changed again already before reaching the targeted new stationary driving state.

It is further noted that the symbols used in the following description refer without exception to time-dependent variables. Thus, the position $\alpha$ of the accelerator pedal is a function of time:

$$\alpha=\alpha(t).$$

Accordingly, the drive output $P_v=P_v(\alpha)$ desired by the driver, which is assigned as predetermined value to an accelerator pedal position, is ultimately also a time-dependent variable:

$$P_v=P_v(\alpha(t))$$

or, in abbreviated form, $$P_v=P_v(t).$$

A set value or reference value of the drive output $P_s$ conveyed to the drive control of the vehicle is a function of time t and of the predetermined output value $P_v$:

$$P_s=P_s(P_v(t), t)$$

or, in abbreviated form, $$P_s=P_s(t).$$

When referring to the driving torque in the following, the corresponding symbols are used in a corresponding sense, where "P" is replaced by "M".

Figure 1:
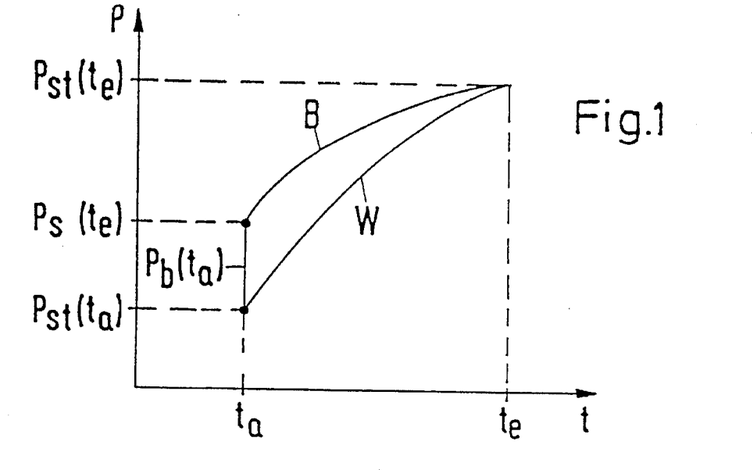
FIG. 1 is a chart showing the drive output as a function of time.

The time curve of the drive output P(t) for a vehicle with an internal combustion engine and fixed speed ratio during an acceleration process taking place in the time interval $t_a$ to $t_e$ is shown schematically in FIG. 1. The driving torque M(t) presents a fundamentally similar curve so that this need not be shown in particular.

The lower curve W is a qualitative representation of the driving resistance curve; that is, it shows the output instantaneously consumed by the driving resistance forces acting externally on the vehicle for each point in time of the acceleration process assuming a constant speed. In the stationary driving state before time $t_a$ and after time $t_e$, this output of the driving resistance forces is in equilibrium with the actually given drive output $P_{st}(t_a)$ or $P_{st}(t_e)$. By actuating the gas pedal at time $t_a$, the driver increases the previous drive output $P_{st}(t_a)$ virtually instantaneously to the value $P(t_a)$ which occurs at the current speed and throttle valve position (corresponding to the accelerator pedal position) of the internal combustion engine corresponding to its speed/torque characteristic. The amount $P_b(t_a)$ by which the new drive output $P(t_a)$ is increased over the output of the external driving resistance forces is available as acceleration output for the increase in speed. In accordance with the characteristic of the internal combustion engine, the drive output increases continuously (upper curve B) at increasing speed until reaching the drive output $P_{st}(t_e)$ which corresponds to the position of the accelerator pedal and is in equilibrium with the output of the external driving resistance forces.

As was already mentioned, a vehicle having a drive which (within wide limits) can be set to almost any desired torque or output at a given rate of revolution (i.e. at a given speed of the vehicle) behaves entirely differently than a conventionally driven vehicle, since the desired torque or output desired by the driver can be adjusted practically instantly, i.e. in the time required to bring the internal combustion engine to the new output. Such a vehicle therefore reacts very roughly or jerkily and, for example, makes it difficult for the driver to move along with the road traffic in a normal manner.

To solve this difficulty, the invention provides another characteristic of the accelerator pedal, i.e., a different reaction of the electronic drive control of the vehicle drive to changes made in the position of the accelerator pedal. The driver effects a change in the speed of the vehicle simply by actuating the accelerator pedal without the need to actuate a special gear or driving characteristic selector. A uniquely defined value for the desired drive output $P_v(\alpha)$ or the desired driving torque $M_v(\alpha)$ is associated with every accelerator pedal position $\alpha(t)$.

This assignment is stored in an additional electronic control unit which functions as a reference value transmitter for the electronic drive control unit or in the drive control unit itself in the form of a table or function.

Figure 2:
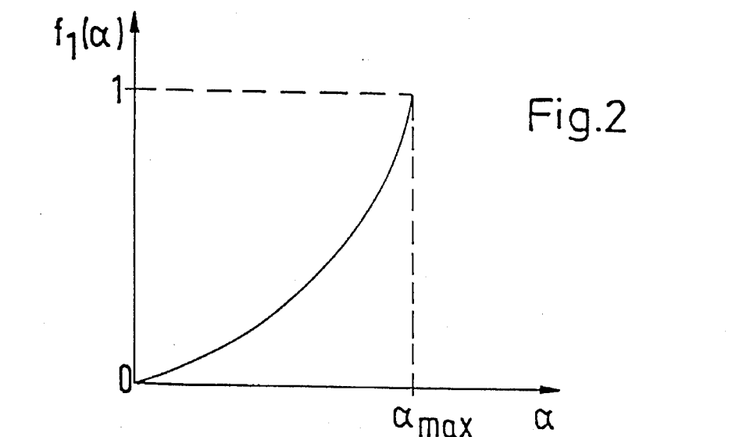
FIG. 2 is a chart showing a weighting factor $f_1$ as a function of the accelerator pedal position $\alpha$.

The following equation applies:

$$M_v(\alpha) = M_{max} \times f_1(\alpha)$$

or $$P_v(\alpha) = P_{max} \times f_1(\alpha),$$

where $M_{max}$ is the maximum driving torque, $P_{max}$ is the maximum drive output, and $f_1(\alpha)$ designates a factor with a value between 0 and 1 dependent on the accelerator pedal position $\alpha(t)$. The functional relationship between the accelerator pedal position $\alpha(t)$ and the value of $f_1(\alpha)$ may be linear, for example. However, a progressive function curve, as is shown schematically in FIG. 2, which ensures a particularly good proportioning of small outputs or torques is more advantageous. By means of a measured value transmitter, the respective accelerator pedal position $\alpha(t)$ is determined and transmitted via signal-transmitting means to the additional electronic control unit. The latter detects and stores the initial position $\alpha_a$ of the accelerator pedal occurring at the start ($t_a$) of an acceleration process as well as its end position $\alpha_e$ by which the driver has conveyed his desire for a change of speed. The invention provides that the reference value of the driving torque $M_s(t_a)$ or drive output $P_s(t_a)$ which corresponds to the values $M_{st}(\alpha_a)$ or $P_{st}(\alpha_a)$ assigned to the accelerator pedal position $\alpha_a$ in stationary driving operation is suddenly increased by a determined value and that the drive output $P(t)$ or the driving torque $M(t)$ is then changed in a time-dependent manner to the value $P_v(\alpha_e)$ or $M_v(\alpha_e)$ assigned to the accelerator pedal position $\alpha_e$.

The sudden increase in the driving torque or drive output by the acceleration torque $M_b(t_a)$ or acceleration output $P_b(t_a)$ is effected according to the following equation:

$$M_b(t_a) = F \times (M_v(\alpha_e) - M_s(\alpha_a))$$

or $$P_b(t_a) = F \times (P_v(\alpha_e) - P_s(\alpha_a))$$

where F is a weighting factor between 0 and 1. $M_s(\alpha_a)$ and $P_s(\alpha_a)$ are the driving torque or drive output in the moment immediately before the start of the acceleration process when the accelerator pedal was still located in the position $\alpha_a$. $M_v(\alpha_e)$ and $P_v(\alpha_e)$ are the desired values for driving torque or drive output corresponding to the selected accelerator pedal position $\alpha_e$.

According to the invention, there are three preferred possibilities for determining the weighting factor F by means of the additional control unit. It is particularly preferred to detect the actuating speed $\dot{\alpha}$ of the accelerator pedal via a sensor by means of the additional electronic control unit and to determine the value of F as a function of the detected value $\dot{\alpha}$. For this purpose, corresponding value tables or functional relationships (linear or nonlinear) can be stored in the electronic control unit. A progressive function curve $F = f_2(\dot{\alpha})$, shown in FIG. 3, which has a tendency to bring about noticeably lower acceleration values with slower acceleration than with quick acceleration is advantageous.

Figure 3:
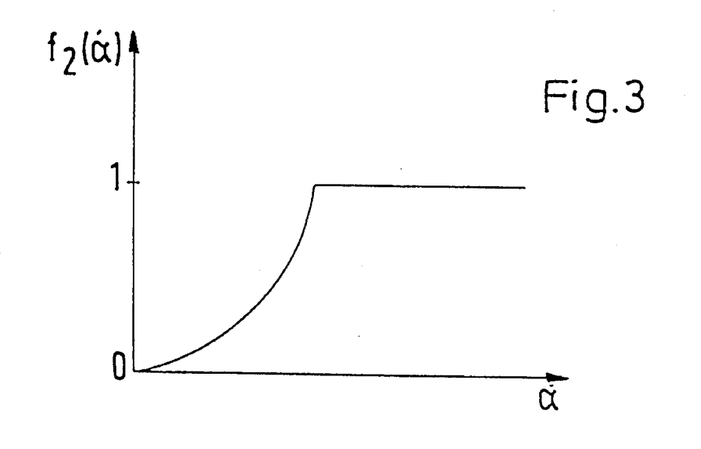
FIG. 3 is a chart showing a weighting factor $f_2$ as a function of the actuating speed $\dot{\alpha}$ of the accelerator pedal.

Accordingly, it is possible, for example, for the driver to achieve the desired target speed in a moderate manner even when there is a great discrepancy between the momentary and desired target speeds. After a determined value of $\dot{\alpha}$, the function $f_2(\dot{\alpha})$ is advisably always assigned a maximum value of 1 as is indicated in FIG. 3. In special cases, $f_2(\dot{\alpha})$ can be kept constant so that the initial acceleration output $P_b(t_a)$ (or the acceleration torque $M_b(t_a)$) would only depend on the difference $P_v(\alpha_e) - P_s(\alpha_a)$ (or $M_v(\alpha_e) - M_s(\alpha_a)$).

A less preferable alternative possibility would be to fix the weighting factor F as a function of the magnitude of the drive output $P_s(\alpha_a)$ (or driving torque) which corresponds to the accelerator pedal position $\alpha_a$ immediately before the acceleration process is initiated:

$$F = f_3(P_s(\alpha_a)).$$

There should be a tendency for $f_3(P_s(\alpha_a))$ to increase as $P_s(\alpha_s)$ increases. The relationship can be nonlinear or linear as is shown schematically in FIG. 4. In so doing, it is again provided, as in FIG. 3, that a maximum value of 1 is always assigned to the function $f_3(P_s(\alpha_a))$ after a determined value of the independent variable $P_s(\alpha_a)$.

A third possibility consists in determining the value of the weighting factor F by means of the new drive output quantity $P_v(\alpha_e)$ (or the new driving torque quantity) desired by the driver, which corresponds to the accelerator pedal position $\alpha_e$:

$$F = f_4(P_v(\alpha_e)).$$

Figure 4:
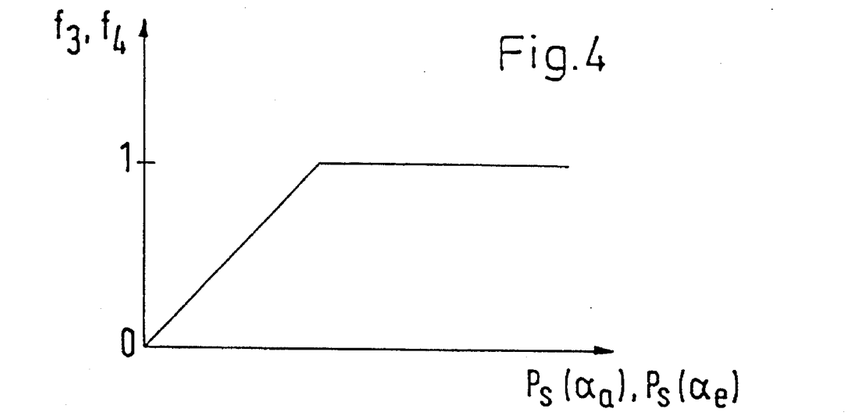
FIG. 4 is a chart showing two weighting factors $f_3$ and $f_4$ as a function of the drive output $P_s(\alpha_a)$ and $P_s(\alpha_e)$.

Since this applies in like manner to the functional dependency of $P_s(\alpha_a)$, a corresponding example is shown by the same curve in FIG. 4.

Figure 5:
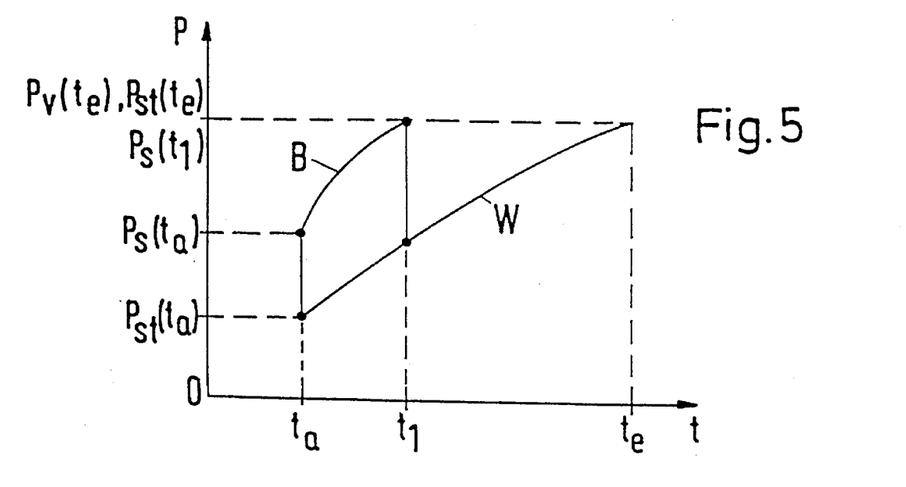
FIG. 5 is a chart showing the time curve of the drive output during an acceleration process.

Again, several possibilities are provided at the start of the acceleration process when the driver wants to accelerate to the drive output $P_v(t_e) = P_{st}(t_e)$ or to the driving torque $M_v(t_e) = M_{st}(t_e)$. In so doing, the reference value $P_s(t)$ or $M_s(t)$ for the drive control unit is changed continuously or discontinuously (by steps) within a short adjustment time period until reaching the predetermined value $P_v(\alpha_e)$ or $M_v(\alpha_e)$ corresponding to the accelerator pedal position $\alpha_e$. A preferred solution consists in progressively increasing the drive output or driving torque during the acceleration process to the provided final value $P_{st}(\alpha_e)$ or $M_{st}(\alpha_e)$ in such a way that the acceleration of the vehicle remains approximately constant. When the provided final value is reached at time $t_1$, the drive output $P_s(t_1)$ or the driving torque $M_s(t_1)$ remains at this final value until the next change in the accelerator pedal position, so that the acceleration of the vehicle decreases continuously to zero after $t_1$ until the end $t_e$ of the entire acceleration process. These relationships are shown schematically for the drive output in FIG. 5, in which the driving resistance curve W is again plotted corresponding to FIG. 1. It can be seen that the acceleration output $P_b(t_1)$ at time $t_1$ when the final value $P_s(t_1) = P_{st}(t_e)$ is reached must be noticeably greater than at the start of the acceleration process ($P_b(t_a)$). The acceleration output is $P_b(t_e) = 0$ at time $t_e$. The total drive output is then required for overcoming the driving resistance.

An acceleration sensor can be provided for detecting the acceleration of the vehicle. However, the acceleration is preferably determined by the additional electronic control unit from the derivative of the speeds of the driving wheels with respect to time.

According to another variant of the invention, the following equation can be also be applied in a time-dependent manner for the transition from the initial drive output $P_s(t_a)$ to the final value $P_v(t_e)$:

$$P_s(t)=P_s(t_a)+f_5(t/T)\times(P_v(t_e)-P_s(t_a)).$$

Figure 6:
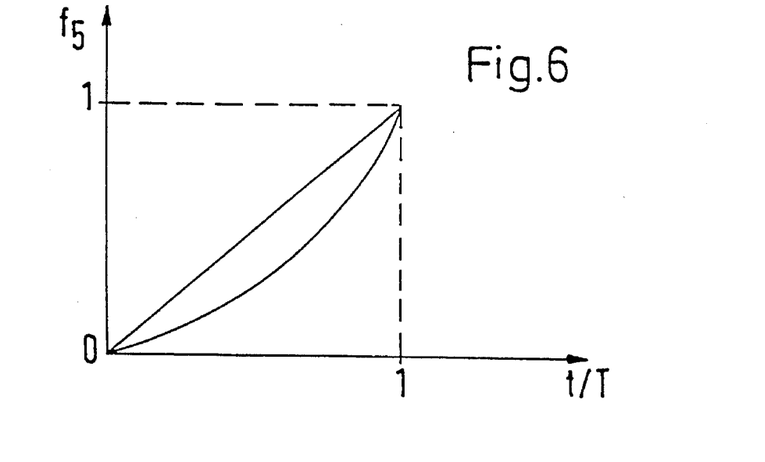
FIG. 6 is a chart showing a weighting factor $f_5$ as a function of time.

When controlling the driving torque, the following corresponding equation applies:

$$M_s(t)=M_s(t_a)+f_5(t/T)\times(M_v(t_e)-M_s(t_a)),$$

where T designates the time interval in which the transition is effected and $f_5(t/T)$ designates a time-dependent weighting factor between 0 and 1. A linear and a progressive curve are shown schematically in FIG. 6 as examples of possible curves for the assignment of the function $f_5$ in dependence on the time parameter t/T carried out by the additional electronic control unit. Other curve shapes can also be provided. It is advantageous for the value of the time interval T to be made dependent on the value of the actuating speed $\dot{\alpha}$ of the accelerator pedal, where T should decrease as $\dot{\alpha}$ increases. This tends to bring about a faster transition to the provided final value, i.e. a shortening of the acceleration process. The same result would occur if the curves according to FIG. 6 were steeper, i.e. if the maximum value $f_5=1$ were achieved already for the value t<T and would then remain constant.

The invention has a particularly advantageous result in a vehicle with electric drive motors supplied with electric power by an internal combustion engine/generator unit when the internal combustion engine is operated in a state with a definite relationship between torque and speed, that is, e.g. at the optimum torque/speed characteristic of the internal combustion engine with respect to consumption. In this case, the drive output $P_s(t)$ can be increased in proportion to the increase in the speed of the internal combustion engine after the sudden increase to $P_s(t_a)$ according to the following equation:

$$P_s(t)=P_s(t_a)+f_6\left(\frac{n-n_a}{n_e-n_a}\right)\times(P_v(t_e)-P_s(t_a)),$$

where $f_6$=speed-dependent factor between 0 and 1
n=actual speed of internal combustion engine
$n_a$=speed of internal combustion engine at output $P_s(t_a)$
$n_e$=speed of internal combustion engine at output $P_v(t_e)$.

The value of the function can be assigned to the factor $f_6$ in a manner analogous to factor $f_5$.

This type of drive control presents the driver with vehicle behavior like that of a conventionally driven vehicle with an internal combustion engine.

Figure 7:
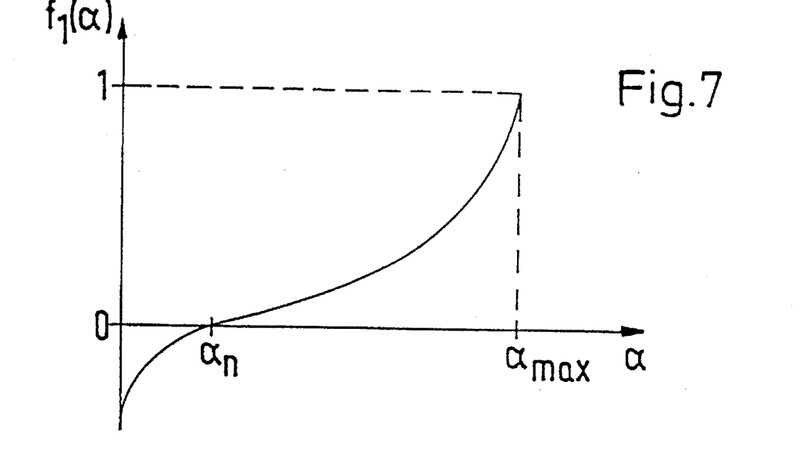
FIG. 7 is a chart showing a weighting factor $f_1$ as a function of the accelerator pedal position.

In addition to the case in which the speed is increased, i.e. that of a positive acceleration of the vehicle, the reverse case of deceleration of the vehicle can also be solved within the scope of the invention by control techniques in such a way that the driver does not perceive the behavior of the vehicle as unaccustomed when backing off the actual position of the accelerator pedal, since he does not notice any braking effect of the drive motor. In order to produce such a braking action, it is provided according to the invention that the additional electronic control unit associates the driving torque or drive output having a value of zero to a neutral position $\alpha_n>0$ of the accelerator pedal, while accelerator pedal positions between zero and $\alpha_n$ correspond to negative values of the driving torque or drive output, that is, they cause a braking output. In an electric motor drive, the braking torque can be produced by switching the electric motors to generator operation. A possible functional relationship for the weighting factor $f_1(\alpha)$ is shown in FIG. 7. The function curve between $\alpha_n$ and the maximum position $\alpha_{max}$ of the accelerator pedal corresponds in practice to the curve from FIG. 2. Below $\alpha_n$, the negative function value of $f_1$ increases as a decreases so that the braking torque $M_B$ also increases according to the following equation:

$$M_B(\alpha)=M_{max}\times f_1(\alpha).$$

The generated braking torque advantageously does not depend exclusively on the accelerator pedal position. Rather the value associated with the accelerator pedal position is reached in a corresponding manner with respect to time. This means that, at first, only a part of the desired braking torque is adjusted in a sudden manner and then a continuous transition occurs until the provided final value is reached, as was already explained above with regard to positive acceleration. However, in so doing, it is particularly advantageous to make this transition dependent on the respective vehicle speed v, that is, to determine the actually applied braking torque $M_B(t)$ according to the following equation:

$$M_B(t)=M_B(\alpha)\times g(v),$$

where g(v) designates a weighting factor between 0 and 1 whose value depends on the vehicle speed v.

Figure 8:
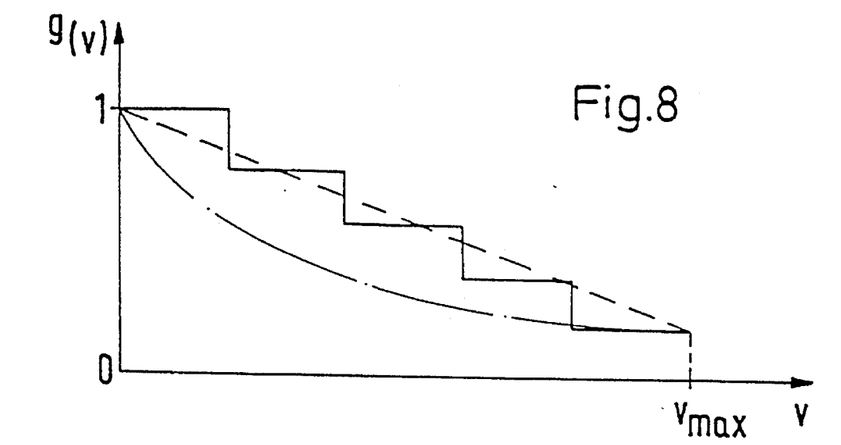
FIG. 8 is a chart showing a weighting factor $g$ as a function of the respective speed of the vehicle.

FIG. 8 shows a linear curve, a degressive curve and a "fixed discontinuity" curve of the function g(v). The applied proportion of the desired braking torque tends to increase as the vehicle speed decreases.

In a further development of the invention it may be advantageous to determine the value of the accelerator pedal actuation speed $\dot{\alpha}$ as a difference rather than in the form of a differential quotient:

$$\dot{\alpha}=\frac{\alpha(t_2)-\alpha(t_1)}{t_2-t_1}$$

That is, a minimum value can be given for the time difference $t_2-t_1$ so that unanticipated "trembling movements", i.e., a slight back and forth motion of the accelerator pedal occurring within a short space of time, are not taken into account, i.e. do not lead to reactions of the drive control unit. The greater the selected value of $t_2-t_1$, the greater the dampening effect which is achieved. An order of magnitude of 100–200 ms may be considered advisable.

Figure 9:
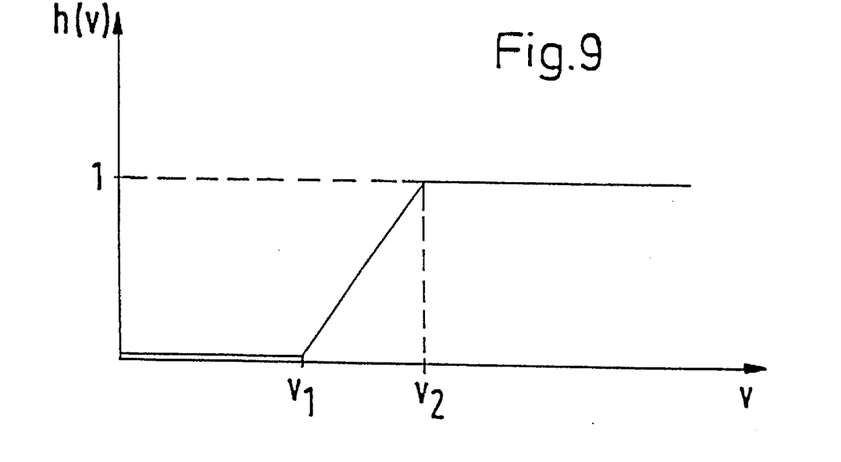
FIG. 9 is a chart showing a transition function $h$ with a combined control of torque and output as a function of the speed of the vehicle.

As shown in the preceding description, the drive control of the vehicle can be geared toward control of the driving torque or control of the drive output. In a further development of the invention, these two possibilities can also be combined and it is possible to switch from one type of control to the other according to given decision criteria. At low vehicle speeds it is particularly advisable to apply a torque control which ensures a sensitive or responsive driving operation and to switch to drive output control at higher speeds. For example, the switching can be effected in a continuous manner in that a combination form of the two drive controls can be applied in a smooth transition in a given speed range according to the following equation:

$$P(\alpha,v)=(1-h(v))\times M(\alpha)\times n_R+h(v)\times P(\alpha),$$

where $n_R$ designates the speed of the driving wheels and h designates a weighting factor between 0 and 1 dependent on the speed of the vehicle. A possible curve for h(v) is shown in FIG. 9. Function h equals zero until reaching speed $v_1$ and then increases linearly as the speed increases to the maximum value 1 and remains at this maximum value above speed $v_2$. A nonlinear function may also be selected in the transitional area, in particular, as indicated in FIG. 9 by the dashed vertical line at $v_2$, a sudden change in the functional value from 0 to 1 could also be provided.

The invention can be applied in a particularly advantageous manner in vehicles provided with permanently excited DC motors with electronically controlled commutation, since the process data (particularly speed and torque) required for the drive control according to the invention are always available in any case as data for "normal" electric motor operation or can easily be derived from the available data, so that additional sensors for data detection may be dispensed with substantially. In addition, the technical drive possibilities possessed by such motors can be exploited to their full extent without the driver having the impression of a completely different behavior of the vehicle. On the contrary, the driver experiences a vehicle which is fundamentally comparable to a conventionally driven vehicle with internal combustion engine, but is offered a clearly greater number of alternative configurations for his driving commands, since practically any optional combination of speed and torque can be adjusted.

Figure 10:
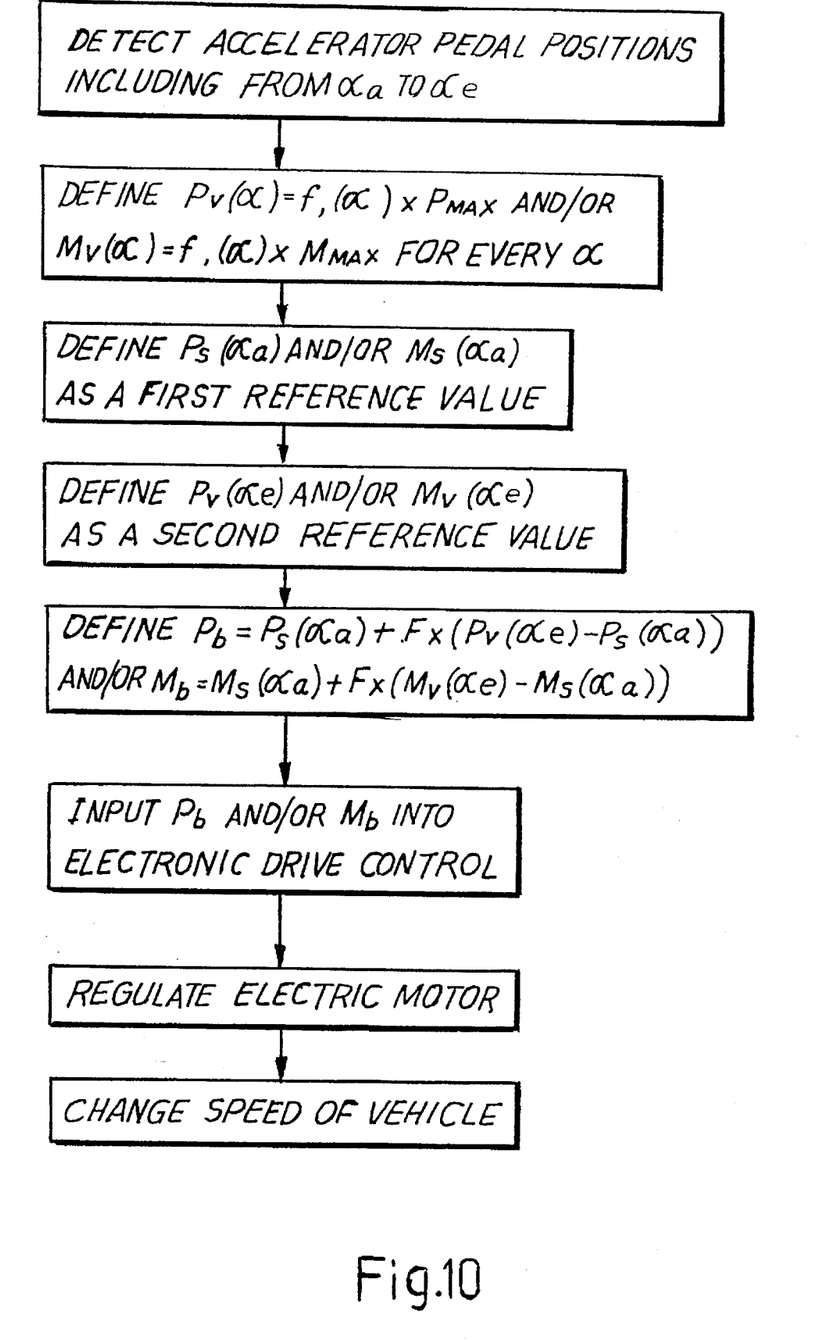
FIG. 10 is a flow chart describing an embodiment of the process of the present invention.
Figure 11:
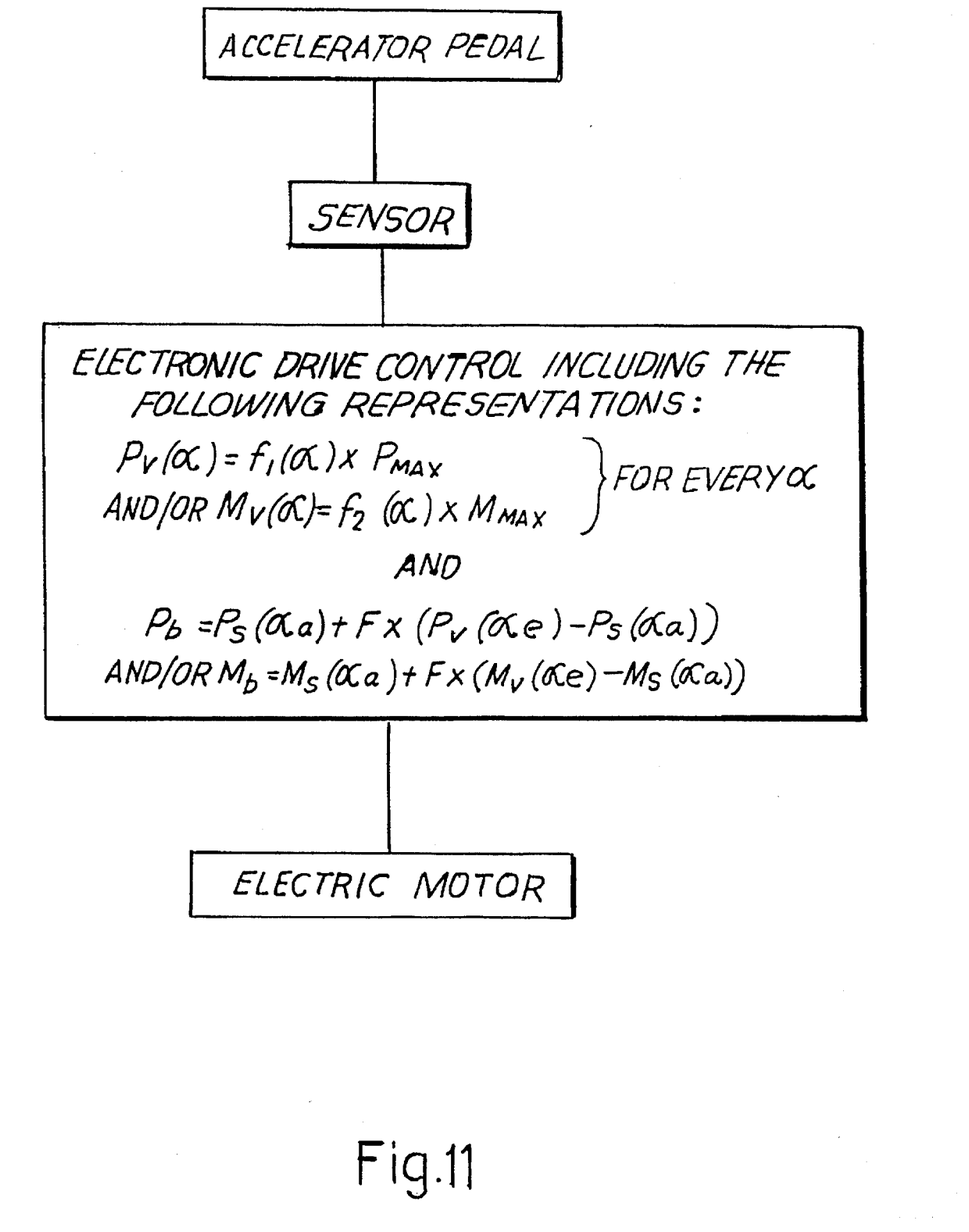
FIG. 11 is a block diagram illustrating an embodiment of the apparatus of the present invention.

In summary, FIG. 10 describes, in the form of a flow chart, the inventive steps of an embodiment of the present invention. The symbols employed in the flow chart are the same as those described in the present specification. FIG. 11 illustrates, in the form of a block diagram, the structural elements and the cooperative relations thereof of an embodiment of the apparatus of the present invention.

We claim:

1. An electronic control process for changing a speed of a vehicle from a first speed to a second speed as a movable accelerator pedal of the vehicle is moved by a driver of the vehicle from a first position to a second position of the accelerator pedal, said vehicle having driving wheels and a drive train with a continuously adjustable speed/torque characteristic corresponding to a change in position of the accelerator pedal, the drive train including an electric drive motor and an electronic control circuit to which a variable actual reference value is input for driving the electric drive motor, the process comprising the steps of: detecting the first and second positions of the accelerator pedal; electronically associating every position of the accelerator pedal with at least one of a predetermined drive output represented by $P_v(\alpha)=f_1(\alpha) \times P_{max}$ (where $P_{max}$=maximum drive output of the vehicle) and a predetermined driving torque represented by $M_v(\alpha)=f_1(\alpha) \times M_{max}$ (where $M_{max}$=maximum driving torque of the vehicle) to define a predetermined value for each said every position; defining from the predetermined value for said first position a first reference value; inputing the first reference value to the electronic drive control for operating the electric drive motor of the vehicle to drive the vehicle at said first speed when the accelerator pedal is in said first position; defining from the predetermined value for said second position a second reference value for operating the electric motor to drive the vehicle at said second speed; changing, in response to movement of the accelerator pedal from said first to said second position, the input to the electronic drive control from said first reference value to said second reference value over an adjustment time period by adding an initial component proportional to the second reference value and a residual component which changes over said adjustment time period; and regulating the electric drive motor using the electronic drive control based upon the actual reference value input to the electronic drive control to change the speed of the vehicle in accordance with the actual reference value input to the electronic drive control.

2. A process according to claim 1, including forming the initial component proportional to the second reference value as a sum of the actual reference value of the electronic drive control and a product of a weighting factor between 0 and 1 and a difference between the second reference value and the actual reference value.

3. A process according to claim 2, including determining a value of the weighting factor as a function of actuation speed of the accelerator pedal.

4. A process according to claim 3, wherein the weighting factor has a selected function curve that increases progressively and the value of the weighting factor remains at a constant maximum value of 1 above a predetermined threshold of the accelerator pedal actuation speed.

5. A process according to claim 3, including changing the residual component for adjusting the actual reference value to the second reference value one of linearly and progressively within a time interval.

6. A process according to claim 5, including selecting the time interval of the electronic control so that it decreases as the accelerator pedal adjusting speed increases.

7. A process according to claim 3, including using a difference quotient $$\dot{\alpha} = \frac{\alpha(t_2) - \alpha(t_1)}{t_2 - t_1}$$

wherein $\dot{\alpha}$ is accelerator pedal speed, $t_1$ and $t_2$ are points in time and $t_2-t_1$ does not fall below a predetermined minimum value.

8. A process according to claim 2, including determining a value of the weighting factor as a function of the actual reference value of the drive control.

9. A process according to claim 8, wherein the weighting factor has a selected function curve that increases linearly and the value of the weighting factor remains at a constant maximum value of 1 above a predetermined threshold of the actual reference value.

10. A process according to claim 2, including determining a value of the weighting factor as a function of the second reference value.

11. A process according to claim 10, wherein the weighting factor has a selected function curve that increases linearly and the value of the weighting factor remains at a constant maximum value of 1 above a predetermined threshold of the second reference value.

12. A process according to claim 1, including detecting acceleration of the vehicle via an acceleration sensor, and changing the residual component for adjusting the actual reference value to the second reference value over time so that the acceleration of the vehicle remains constant between a time when a changed accelerator pedal position is reached and a time when the second reference value is reached.

13. A process according to claim 1, including determining acceleration of the vehicle by a derivative of speed of the driving wheels over time and changing the residual component for adjusting the actual reference value to the second reference value over time so that the acceleration of the vehicle remains constant between a time when a changed accelerator pedal position is reached and a time when the second reference value is reached.

14. A process according to claim 1, including supplying electric current to the electric drive motor with an internal combustion engine/generator unit, operating the internal combustion engine in a state with a definite relationship between torque and speed of the internal combustion engine, and changing the residual component for adjusting the actual reference value to the second reference value as a function of speed of the internal combustion engine.

15. A process according to claim 14, including associating the factor $f_1(\alpha)$ with a value of zero in a neutral position of the accelerator pedal and, at accelerator pedal positions between zero and the neutral position, with negative values for producing a braking torque by switching the electric drive motor to generator operation.

16. A process according to claim 15, including adjusting the braking torque at a given position of the accelerator pedal up to the neutral position as a function of actual vehicle speed so that there is a tendency toward lower braking torque at higher speeds.

17. A process according to claim 1, including carrying out changes in speed below a predetermined vehicle speed $v_1$ only by controlling driving torque and above a predetermined vehicle speed $v_2$ only by controlling the drive output.

18. The process according to claim 17, including effecting a transition from torque control to output control in a sudden manner when the vehicle speed $v_1$ equals the vehicle speed $v_2$.

19. A process according to claim 17, including effecting a transition from torque control to output control in one of a smooth manner and a sliding manner in a speed interval from the first speed to the second speed.

20. A motor vehicle, comprising: driving wheels; a drive train having a continuously adjustable speed/torque characteristic and an electric drive motor; electronic drive control means for speed/torque adjustment in the drive train; an accelerator pedal selectively movable through a range of possible pedal positions so as to regulate the speed of the vehicle; first sensor means for detecting a position of the accelerator pedal; the electronic drive control means being operative for storing at least one of predetermined values for a desired effective drive output of the vehicle and a desired driving torque in one of tabular form and as a function, which values are associated in one-to-one correspondence with the possible accelerator pedal positions; an additional electronic control means; and a signal-transmitting means connecting the additional electronic control means with the first sensor means for detecting the accelerator pedal position, the additional electronic control means being connected as a reference value transmitter with the electronic drive control means and being operative to convert measurement values obtained by the first sensor means into the reference value for the drive control means so that the reference value is changed within an adjustment time period until reaching a respective predetermined value, the reference value being formed by addition of an initial component proportional to the predetermined value and a residual component which changes over time, the electronic drive control being operative to regulate the electric drive motor based upon the reference value to change the speed of the vehicle responsive to the accelerator pedal.

21. A motor vehicle according to claim 20, and further comprising second sensor means for detecting vehicle acceleration and further signal transmitting means for connecting the additional electronic control means with the second sensor means.

22. A motor vehicle according to claim 20, wherein the additional electronic control means includes differentiating means for calculating vehicle acceleration from a change in driving wheel speeds over time.

23. A motor vehicle according to claim 20, wherein the electric motor drive includes at least one permanently excited DC motor with electronic commutation.

* * * * *